US007576661B2

(12) United States Patent
Mochizuki

(10) Patent No.: US 7,576,661 B2
(45) Date of Patent: Aug. 18, 2009

(54) TRAFFIC INFORMATION CALCULATION DEVICE, TRAFFIC INFORMATION CALCULATION METHOD, TRAFFIC INFORMATION DISPLAY METHOD, AND TRAFFIC INFORMATION DISPLAY DEVICE

(75) Inventor: Makoto Mochizuki, Yokohama (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 10/587,783

(22) PCT Filed: Feb. 4, 2005

(86) PCT No.: PCT/JP2005/002087

§ 371 (c)(1),
(2), (4) Date: Jul. 28, 2006

(87) PCT Pub. No.: WO2005/078679

PCT Pub. Date: Aug. 25, 2005

(65) Prior Publication Data

US 2007/0171095 A1 Jul. 26, 2007

(30) Foreign Application Priority Data

Feb. 13, 2004 (JP) ............................. 2004-036377
Jan. 20, 2005 (JP) ............................. 2005-012317

(51) Int. Cl.
*G08G 1/09* (2006.01)
*G08G 1/123* (2006.01)
*B60Q 1/00* (2006.01)

(52) U.S. Cl. ............. 340/905; 340/995.13; 340/995.19; 701/117; 701/118

(58) Field of Classification Search ................. 340/905, 340/995.13
See application file for complete search history.

(56) References Cited

U.S. PATENT DOCUMENTS

| | | | | |
|---|---|---|---|---|
| 5,428,545 | A * | 6/1995 | Maegawa et al. | 701/210 |
| 6,438,490 | B2 * | 8/2002 | Ohta | 701/210 |
| 7,103,470 | B2 * | 9/2006 | Mintz | 701/117 |
| 2002/0116118 | A1 | 8/2002 | Stallard et al. | |

FOREIGN PATENT DOCUMENTS

JP 6-348997 A 12/1994

(Continued)

OTHER PUBLICATIONS

International Search Report for PCT/JP2005/002087, dated Mar. 22, 2005.

*Primary Examiner*—Donnie L Crosland
(74) *Attorney, Agent, or Firm*—RatnerPrestia

(57) ABSTRACT

A traffic information calculation device includes: a probe information database for accumulating vehicle information including a vehicle position and the time of the vehicle position; a branch judgment unit for judging the branch direction of the vehicle at an intersection according to the position of the intersection on the map database and the vehicle information; and intersection traffic information calculation unit for calculating the wait time or jam length of the branch direction at the intersection from the vehicle information. Thus, the intersection traffic information calculation unit can calculate the traffic information for each branch direction at the intersection and it is possible to obtain accurate traffic information for each branch direction even at an intersection having five directions or more.

6 Claims, 14 Drawing Sheets

FOREIGN PATENT DOCUMENTS

| | | | |
|---|---|---|---|
| JP | 2000-311286 | A | 11/2000 |
| JP | 2001-307291 | A | 11/2001 |
| JP | 2003-281674 | A | 10/2003 |
| JP | 2003-288673 | A | 10/2003 |
| JP | 2004-272839 | A | 9/2004 |

* cited by examiner

Fig.10

| CLASSIFICATION PATTERN / INTERSECTION NAME | | RIGHT-TURN-WAITING INFORMATION AT MM INTERSECTION | | RIGHT-TURN-WAITING INFORMATION AT NN INTERSECTION | |
|---|---|---|---|---|---|
| TYPE | TIME FRAME | WAITING TIME (MINUTE) | JAM LENGTH (m) | WAITING TIME | JAM LENGTH |
| WEEKDAY | MORNING | 5 | 100 | | |
| | AFTERNOON | 15 | 350 | | |
| | NIGHTTIME | 5 | 150 | | |
| WEEKEND | MORNING | 10 | 200 | | |
| | AFTERNOON | 20 | 400 | | |
| | NIGHTTIME | 10 | 200 | | |
| LONG CONSECUTIVE HOLIDAYS | MORNING | 25 | 550 | | |
| | AFTERNOON | 25 | 500 | | |
| | NIGHTTIME | 15 | 300 | | |
| New Year's DAY | MORNING | 5 | 100 | | |
| | AFTERNOON | 5 | 50 | | |
| | NIGHTTIME | 5 | 50 | | |

TRAFFIC INFORMATION CALCULATION DEVICE, TRAFFIC INFORMATION CALCULATION METHOD, TRAFFIC INFORMATION DISPLAY METHOD, AND TRAFFIC INFORMATION DISPLAY DEVICE

This application is a U.S. National Phase Application of PCT International Application PCT/JP2005/002087 filed Feb. 4, 2005.

TECHNICAL FIELD

The present invention relates to a traffic information calculation device, and a traffic information calculation method for calculation of traffic information based on vehicle information detected by a probe vehicle or others, and a traffic information display method, and a traffic information display device.

BACKGROUND ART

Conventionally, as a device for calculating traffic information, known is the one described in JP-A-11-328580.

The traffic information calculation device described in JP-A-11-328580 is configured by an vehicle mounted device and an information center as below.

The vehicle mounted device is mounted in a vehicle, and is provided with traffic information provision means that is configured to be able to automatically or manually provide the center with traffic information data about the area in the vicinity of the vehicle, and vehicle mounted device control means that exercises control to enable exchanging of the traffic information data with the center via wireless communication method.

The information center is provided with: database creation means that receives the traffic information data from the vehicle carrying therein the vehicle mounted device, and creates a traffic information database based on the received traffic information data; search means that searches, in response to a search request from the vehicle mounted device for the traffic information data of a predetermined region, the traffic information data of the predetermined region; and center-end control means that exercises control to forward the traffic information data of the predetermined region found by the search means to the vehicle mounted device that is a source of a transmission request for the traffic information data of the predetermined region.

With such a configuration, in the traffic information calculation device described in JP-A-11-328580, the information center collects the traffic information data about the area in the vicinity of the vehicle carrying therein the vehicle mounted device, creates a database, and provides the vehicle with any needed traffic information data in response to a request coming from the vehicle.

Herein, the traffic information data also includes data about waiting time at intersections to make right or left turn, for example. For calculation thereof, the vehicle mounted device produces, as a waiting time for right or left turn, the time duration when the vehicle speed is at a given speed or slower with the turn signal turned on, and transmits the result to the information center. Based on the result, the information center calculates an average value of the waiting time for right and left turns, and provides the calculation result as a part of the traffic information data to the vehicle being the source of the request.

Moreover, conventionally, as a method for an vehicle mounted device to display traffic information, known is the one described in JP-A-2004-234649.

In the traffic-information display method described in JP-A-2004-234649, an vehicle mounted navigation device accumulates congestion information coming from a traffic information provision center or vehicles, and creates congestion statistical information through statistical analysis performed on the information about a specific road interval for every season, every day of a week, and others. The navigation device acquires the resulting traffic congestion statistical information for display of a map on the screen.

This enables the navigation device to display, on the map, frequent points of traffic congestion on the road through with statistical analysis, average level of traffic congestion thereon, occurrence time of traffic congestion thereon, and others, and eases users to make their decisions to avoid traffic congestion.

The problem with the conventional traffic information calculation device described in JP-A-11-328580 is that, although information about making right and left turns at intersections is indeed acquired, the branch direction is determined only whether the turn signal is on or off, and therefore there is a difficulty in knowing if the branch direction is toward the front right, toward the far right, or others. If with a complicated-shaped intersection of five or more roads, e.g., five- or six-forked road, it is almost impossible to know the specific branch direction, resulting in the problem of not being able to correctly represent intersection traffic information for every branch direction.

The problem with the conventional traffic information calculation device described in JP-A-11-328580 is that, although the information center is using information about turn signals coming from vehicle mounted devices to perform statistical analysis on the traffic congestion information, every vehicle mounted device is not always provided with the function of transmitting information about the turn signals as of this point in time. It thus means that the information center is not always having the information about the turn signals of every vehicle mounted device, and there is a limitation for the data available for collection by the information center, thereby leading to a problem of not being able to have correct information.

Moreover, in the conventional traffic information calculation device described in JP-A-11-328580, an vehicle mounted device itself is provided with means for calculating the data about the waiting time at intersections. With such a configuration, if the information center wants to have all information including the turn signal information from the vehicle mounted devices, there needs to make improvements to those vehicle mounted devices, e.g., provide means to every vehicle mounted device for calculating the data about the waiting time at intersections, or provide means thereto for detecting the turn signal information. As such, there is a problem of not being able to use the current vehicle mounted devices without making improvements thereto.

Furthermore, with the traffic-information display method described in JP-A-2004-234649, although information about the road through with statistical analysis can be indeed displayed on the map, e.g., frequent points of traffic congestion, average level of traffic congestion, and occurrence time of traffic congestion, the traffic congestion information is not displayed in accordance with the branch direction, e.g., the traffic congestion information does not tell which branch direction at an intersection is congested, or if congested, the level of congestion of the direction. This results in the problem that the users cannot make their determinations, to their perfect satisfaction, to avoid the traffic congestion.

DISCLOSURE OF THE INVENTION

An object of the present invention is to provide a traffic information calculation device, a traffic information calculation method, a traffic information display method, and a traffic information display device, with which a waiting time and a jam length at an intersection on a map database can be easily calculated and displayed for every branch direction based on vehicle information including the vehicle position and the time.

A traffic information calculation device of the present invention has a configuration, including: vehicle information acquisition means that acquires vehicle information including the position of a vehicle, and the time at the position of the vehicle; branch determination means that determines, from the position of an intersection on a map database and the vehicle information, a branch direction of the vehicle at the intersection; and intersection traffic information calculation means that calculates, from the vehicle information, a waiting time or a jam length at the intersection for each of the branch directions.

Such a configuration enables to determine in which branch direction a vehicle at an intersection is heading by establishing a correlation among information in the map database, i.e., the position of the intersection, the shape of the road, and trace information of the vehicle, and enables to generate intersection traffic information using vehicle information. Even with a complicated-shaped intersection of five or more branches that has been difficult for branch determination based on turn signals, the branch determination can be thus correctly made, and the intersection traffic information can be also correctly generated, there by producing the effects of enabling generation of intersection traffic information for every branch direction irrespective of the shape of the intersection.

Further, the traffic information calculation device of the present invention has a configuration that the intersection traffic information calculation means calculates the waiting time or the jam length at the intersection for each of the branch directions using a driving speed of the vehicle derived from the vehicle information.

Such a configuration enables the intersection traffic information calculation means to calculate a waiting time or a jam length at an intersection for every branch direction using the driving speed of the vehicle derived from the vehicle information. Even with a complicated-shaped intersection of five or more branches that has been difficult for branch determination based on turn signals, the branch determination can be thus correctly made, and the intersection traffic information can be also correctly generated, thereby producing the effects of enabling generation of intersection traffic information for every branch direction irrespective of the shape of the intersection.

Still further, the traffic information calculation device of the present invention has a configuration that the driving speed of the vehicle is derived based on at least either a vehicle speed pulse signal or positioning satellite information.

With such a configuration, the driving speed of the vehicle can be easily derived using vehicle speed pulses, or correctly derived using GPS information, thereby producing the effects of calculating, with ease or precision, a waiting time or a jam length at an intersection for every branch direction.

Still further, a traffic information calculation method of the present invention is configured to acquire vehicle information including the position of a vehicle and the time at the position of the vehicle, to determine, from the position of an intersection on a map database and the vehicle information, a branch direction of the vehicle at the intersection, and to calculate, from the vehicle information, a waiting time or a jam length at the intersection for each of the branch directions.

Such a configuration enables to determine in which branch direction a vehicle at an intersection is heading by establishing a correlation among information in the map database, i.e., the position of the intersection, the shape of the road, and trace information of the vehicle, and enables to generate intersection traffic information using vehicle information. Even with a complicated-shaped intersection of five or more branches that has been difficult for branch determination based on turn signals, the branch determination can be thus correctly made, and the intersection traffic information can be also correctly generated, thereby producing the effects of enabling generation of intersection traffic information for every branch direction irrespective of the shape of the intersection.

Still further, with a traffic information display method of the present invention, an intersection is displayed on a map, and in accordance with the intersection on the map, awaiting time or a jam length at the intersection is displayed for every branch direction.

With such a configuration, through display of information at an intersection on a map, e.g., the waiting time or the jam length for every branch direction, there are effects that drivers can easily understand the traffic information at the intersection for every branch direction.

Still further, the traffic information display device of the present invention has a configuration, including: cartographic information storage means that stores cartographic information including an intersection, and display means that displays, in accordance with the intersection on a map stored in the cartographic information storage means, a waiting time or a jam length at the intersection for every branch direction.

With such a configuration, through display of information at an intersection on a map, e.g., the waiting time or the jam length for every branch direction, there are effects that drivers can easily understand the traffic information at the intersection for every branch direction.

As such, the traffic information calculation device of the present invention is provided with: vehicle information acquisition means that acquires vehicle information including the position of a vehicle, and the time at the position of the vehicle; branch determination means that determines, from the position of an intersection on a map database and the vehicle information, a branch direction of the vehicle at the intersection; and intersection traffic information calculation means that calculates, from the vehicle information, a waiting time or a jam length at the intersection for each of the branch directions. Even with a complicated-shaped intersection of five or more branches that has been difficult for branch determination based on turn signals, the branch determination can be thus easily made, and the intersection traffic information can be also easily generated, thereby producing the effects of enabling generation of intersection traffic information for every branch direction irrespective of the shape of the intersection.

Moreover, a traffic information calculation method of the present invention is configured to acquire vehicle information including the position of a vehicle and the time at the position of the vehicle, to determine, from the position of an intersection on a map database and the vehicle information, a branch direction of the vehicle at the intersection, and to calculate, from the vehicle information, a waiting time or a jam length at the intersection for each of the branch directions. Even with a complicated-shaped intersection of five or more branches that has been difficult for branch determination based on turn signals, the branch determination can be thus easily made, and the intersection traffic information can be also easily generated, thereby producing the effects of enabling generation of intersection traffic information for every branch direction irrespective of the shape of the intersection.

Further, with a traffic information display method of the present invention, an intersection is displayed on a map, and in accordance with the intersection on the map, a waiting time or a jam length at the intersection is displayed for every branch direction. Through display of information at an intersection on a map, e.g., the waiting time or the jam length for every branch direction, there are the effects that drivers can easily understand the traffic information at the intersection for every branch direction.

Still further, a traffic information display device of the present invention has a configuration, including: cartographic information storage means that stores cartographic information including an intersection, and display means that displays, in accordance with the intersection on a map stored in the cartographic information storage means, a waiting time or a jam length at the intersection for every branch direction. Through display of information at an intersection on a map, e.g., the waiting time or the jam length for every branch direction, there are the effects that drivers can easily understand the traffic information at the intersection for every branch direction.

BRIEF DESCRIPTION OF THE DRAWINGS

FIG. 10 is a diagram showing an exemplary classification of statistical intersection traffic information for use in an exemplary intersection traffic information generation unit for use in the traffic information calculation device in the third embodiment of the present invention.

BEST MODE FOR CARRYING OUT THE INVENTION

In the below, embodiments of the present invention are described by referring to the accompanying drawings.

First Embodiment

Figure 1:
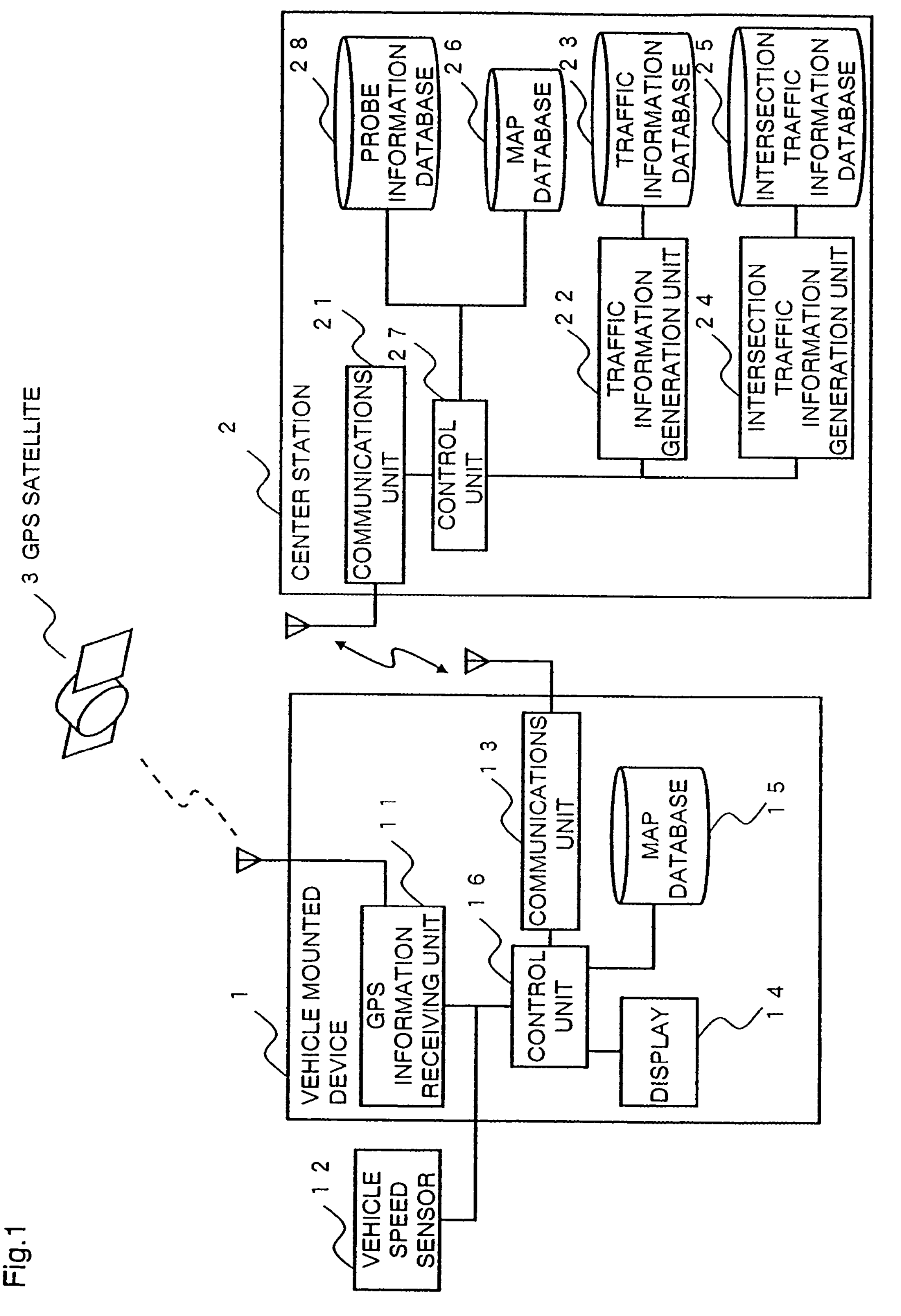
FIG. 1 is a block diagram showing the schematic configuration of a traffic information calculation device in a first embodiment of the present invention.

FIG. 1 is a block diagram showing the schematic configuration of a traffic information calculation device in a first embodiment of the present invention. Note here that, in the description below, a vehicle carrying therein an vehicle mounted device that is capable of transmitting information about both the vehicle position and vehicle speed at a specific time to a center station is referred to as probe vehicle. Moreover, information accumulated in the vehicle mounted device for a fixed length of time or a fixed distance about the vehicle position and the vehicle speed at a specific time, and transmitted to the center station is referred to as probe information.

An vehicle mounted device 1 includes: a GPS information receiving unit 11 that receives GPS information from a GPS satellite 3; a vehicle speed sensor 12 that detects the vehicle speed from vehicle speed pulses, a communications unit 13 for transmitting probe information to a center station 2; a display 14 that displays cartographic information and any other information; a map database 15 that stores the cartographic information; and a control unit 16 that exercises control over these components. Note here that, to calculate intersection traffic information using vehicle speed information calculated from the GPS information received by the GPS information receiving unit 11, the vehicle speed sensor 12 is not always needed.

The center station 2 includes: a communications unit 21 that performs data transmission and reception to/from the vehicle mounted device 1; a probe information database 28 that stores the received probe information; a traffic information generation unit 22 that produces the traveling time and the level of congestion from the received probe information; a traffic information database 23 that stores the produced traveling time and level of congestion; an intersection traffic information generation unit 24 that generates intersection traffic information being congestion information at an intersection for every branch direction; an intersection traffic information database 25 that stores the intersection traffic information; a map database 26 that stores the cartographic information; and a control unit 27 that exercises control over these components.

Described next is the operation of a traffic information calculation device in this embodiment.

In the vehicle mounted device 1, a storage section (not shown) in the control unit 16 accumulates both the vehicle speed information detected by the vehicle speed sensor 12, and the information about the vehicle position received and acquired by the GPS information receiving unit 11 for a fixed time duration. The information is transmitted by the communications unit 13 to the center station 2 at any arbitrary timing controlled by the control unit 16, e.g., every predetermined fixed length of time or fixed distance of driving.

Note herein that, when the vehicle speed information is derived from the GPS information received by the GPS information receiving unit 11, the vehicle mounted device 1 can use the vehicle speed information. Moreover, because the vehicle information frequently coming from the vehicle speed sensor 12 is generally better in accuracy compared with the GPS information, the vehicle speed information detected by the vehicle speed sensor 12 and the vehicle speed information derived from the GPS information can be put in use after these vehicle information are corrected.

That is, by generating the intersection traffic information using the vehicle speed information calculated from the vehicle speed pulse information, and the vehicle speed information calculated from the GPS information collected by the current vehicle mounted device, the vehicle speed pulse information and the GPS information can be complimented if data collection is not complete so that the resulting intersection traffic information will have much better accuracy. Also for practical use, there is no need to make improvements to the vehicle mounted device itself so that the cost can be usefully reduced.

The communications unit 13 is exemplified by a mobile phone, an optical beacon, a digital MCA, and others.

As such, after the vehicle mounted device 1 transmits to the center station 2, as the probe information, the vehicle speed information of its own vehicle, the position information thereof, and the time information, in the center station 2, under the control of the control unit 27, the communications unit 21 receives the probe information for storage into the probe information database 28, and the traffic information generation unit 22 generates traffic information (traveling time information, traffic congestion information) for a specific predetermined interval using the probe information stored in the probe information database 28. Herein, when generating the traffic information, the traffic information generation unit 22 applies smoothing for generation by going through a statistical process, e.g., calculates an average value of several pieces of probe information, for the aim of reducing the driving variation among vehicles. The traffic information generation unit 22 establishes a correlation between the generated traffic information and the map database 26 as the traffic information for a specific interval, and stores the result to the traffic information database 23 as traffic information to be distributed at a specific time. For example, after establishing a correlation between a predetermined interval on a map, and the vehicle speed, the driving time, or others at a specific time in the predetermined interval, the traffic information generation unit 22 stores the information to the traffic information database 23.

After the probe information is received by the center station 2 and stored in the probe information database 28, similarly to the traffic information, moreover, the intersection traffic information generation unit 24 generates the intersection traffic information using the probe information stored in the probe information database 28. Based on the trace in the received probe information, and the position information about the intersection in the map database 26 corresponding to the probe information, the intersection traffic information generation unit 24 determines whether the trace in the received probe information has passed the intersection or not. When the trace in the received probe information has already passed the intersection, a determination is made about the branch direction at the intersection. The intersection traffic information generation unit 24 calculates the waiting time and the jam length at the intersection for each of the branch directions, correlates each thereof with the intersection in the map database 26, and stores the result to the intersection traffic information database 25 as the intersection traffic information to be distributed at a specific time.

Herein, when the vehicle mounted device 1 makes a request to the center station 2 for the traffic information, the control unit 27 of the center station 2 searches for and acquires any needed information from the traffic information database 23 and the intersection traffic information database 25, e.g., the level of congestion in the vicinity of the vehicle mounted device 1 at the time, and forwards the found and acquired traffic information to the vehicle mounted device 1 via the communications unit 21.

The vehicle mounted device 1 receives, via the communications unit 13, the traffic information coming from the center station 2 in response to the request, and based on the received traffic information, the control unit 16 reads the cartographic information about the intersection in the vicinity of the vehicle mounted device 1, for example, from the map database 15, and displays on the display 14 the waiting time and the jam length at the intersection for every branch direction together with the intersection.

More in detail, on a display screen of a map covering the vehicle position and the heading direction with a general car navigation display method, the control unit 16 displays the waiting time and the jam length at the intersection for every branch direction together with the intersection.

As such, according to the present embodiment, the intersection traffic information generation unit 24 of the center station 2 calculates both the waiting-at-intersection time and the jam length at the intersection for every branch direction.

Described next in more detail is the intersection traffic information generation unit 24 of the center station 2 in the present embodiment.

Figure 2:
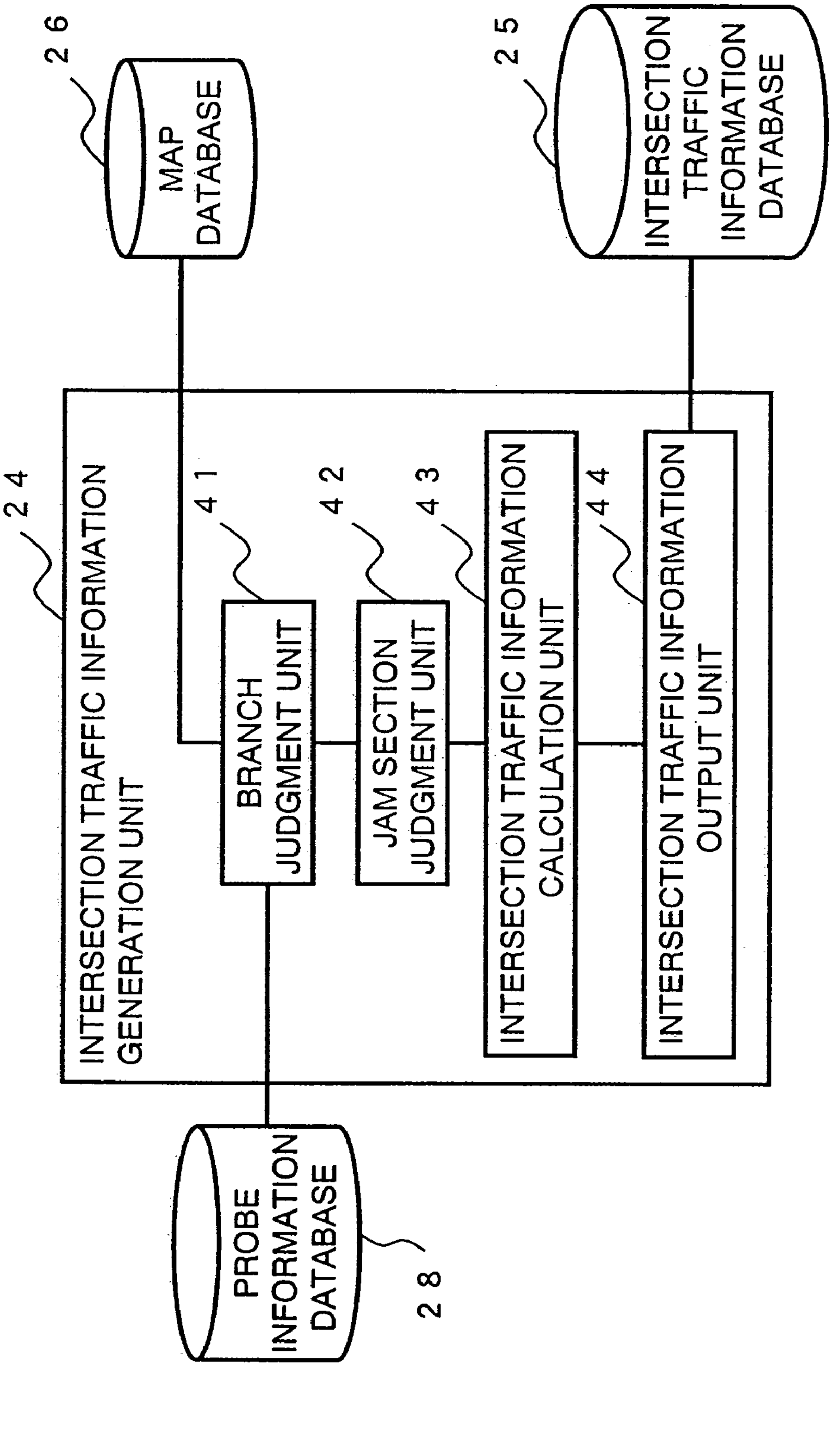
FIG. 2 is a block diagram showing an exemplary intersection traffic information generation unit for use in a traffic information calculation device in the first embodiment of the present invention.

FIG. 2 is a block diagram showing an exemplary intersection traffic information generation unit 24 for use in the traffic information calculation device in the present embodiment. Note here that FIG. 2 is not showing the control unit 27.

The intersection traffic information generation unit 24 includes: a branch judgment unit 41 that determines the branch direction using trace information of the probe information database 28, and information of the map database 26, i.e., the position of the intersection, and the topography covered by a road network; a jam section judgment unit 42 that determines a congestion interval; an intersection traffic information calculation unit 43 that calculates the waiting time and the jam length at the intersection; and an intersection traffic information output unit 44 that stores the calculated intersection traffic information to the intersection traffic information database 25.

Figure 3:
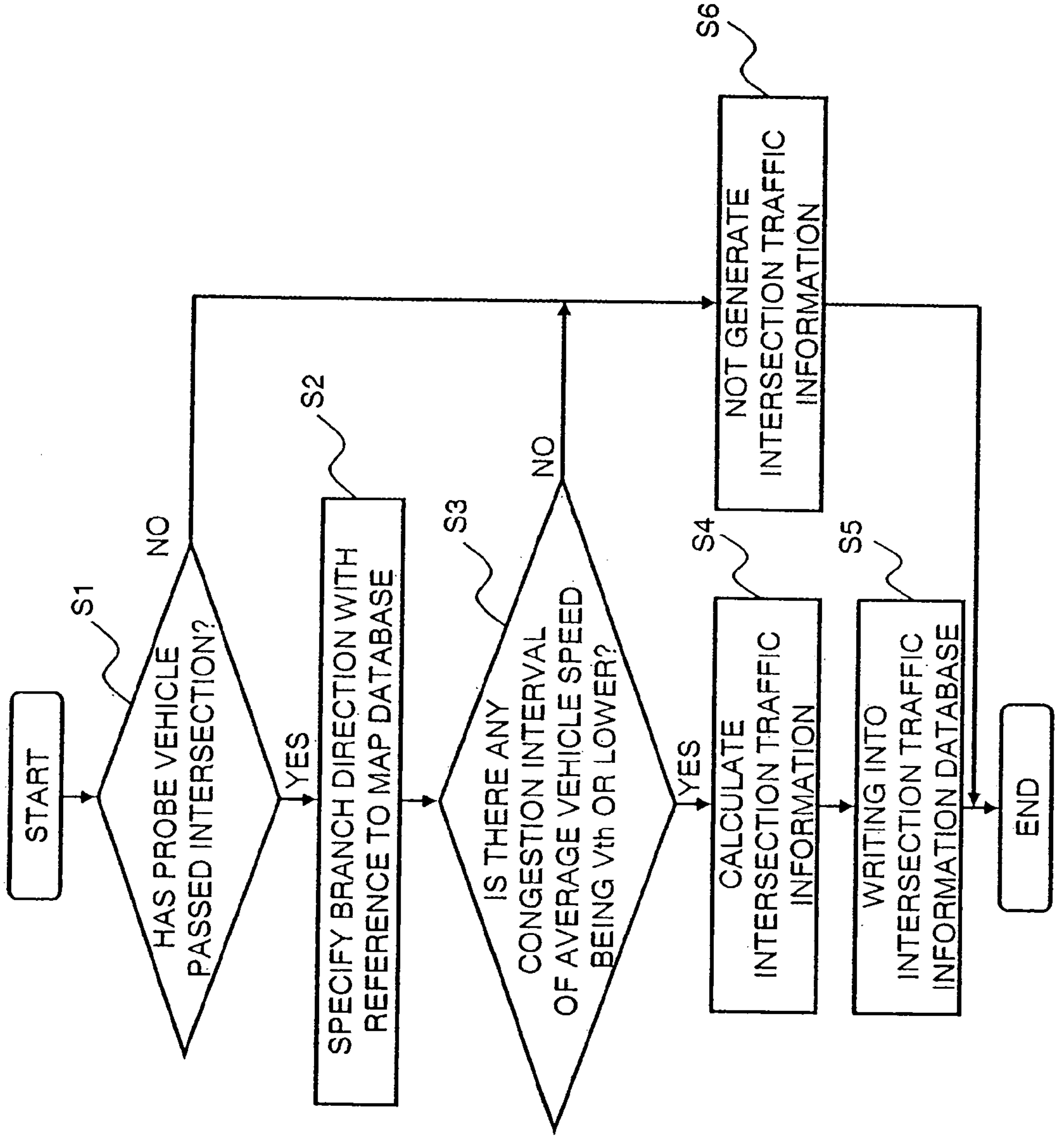
FIG. 3 is a flowchart showing an exemplary operation of an intersection traffic information generation unit for use in the traffic information calculation device in the first embodiment of the present invention.

FIG. 3 is a flowchart showing the operation of the intersection traffic information generation unit 24 configured as such. In the below, described is the operation of the intersection traffic information generation unit 24 using this flowchart.

The branch judgment unit 41 compares the trace shape of the probe vehicle derived from the probe information provided by the vehicle mounted device 1 and received by the center station 2, and the position information at the intersection in the map database corresponding to the trace, and determines whether the probe vehicle has passed the intersection or not (S1). When the probe vehicle is determined as having been passed the intersection, the probe vehicle also determines in which branch direction the probe vehicle is directed from the intersection (S2). When the branch judgment unit 41 determines that the probe vehicle has not yet passed the intersection, the intersection traffic information calculation unit 43 does not generate the intersection traffic information (S6).

As to the probe information determined by the branch judgment unit 41 as having been passed the intersection, the jam section judgment unit 42 makes a determination about any congested interval caused by vehicles waiting to pass the intersection. Based on the probe information determined as having been passed the intersection, the jam section judgment unit 42 calculates an average vehicle speed Vave of the probe vehicle for every fixed distance or every fixed length of time, i.e., every arbitrary small interval. When the average vehicle speed Vave is lower than a threshold value Nth (e.g., 10 km/h) being a congestion determination factor, the corresponding small interval is determined as being a congestion interval. The jam section judgment unit 42 regards an interval from the small interval firstly determined in the upstream of the traffic flow as a congestion interval to the intersection as a congestion interval caused by vehicles waiting to pass the intersection (S3).

When the jam section judgment unit 42 determines that there is no congestion interval, the intersection traffic information calculation unit 43 does not generate the intersection traffic information (S6). Here, the vehicle speed information for use for generating the intersection traffic information is the vehicle speed information as a result of calculation using at least one of the vehicle speed pulses or the GPS information.

The intersection traffic information calculation unit 43 calculates the distance of a congestion interval as a jam length L. At the same time, the time taken to pass the congestion interval is calculated as a passing time T (S4). Note that, to calculate this passing time T, the time required to pass the intersection may be calculated from the point before the intersection by a predetermined distance (e.g., 100 m). To calculate the intersection traffic information about a specific intersection such as intersection frequently causing traffic congestions, the intersection traffic information calculation unit 43 adopts the latter calculation method using the past data for the intersection so that the resulting calculated passing time can be more precise.

The intersection traffic information output unit 44 applies smoothing to the intersection traffic information calculated as such (jam length, passing time), e.g., average the intersection traffic information calculated based on a plurality of probe vehicles, and stores the result to the intersection traffic information database 25 to enable reading from the control unit 27 (S5).

When there is no need to provide every intersection with the intersection traffic information, e.g., when the intersection traffic information database 25 is limited in capacity, and when there is any intersection that hardly causes traffic congestions, the above-described process may be executed only at any predetermined main intersection, or only to specific branch directions.

With such a configuration, in the present embodiment, the branch judgment unit 41 of the center unit 2 determines how the trace in the probe information has passed the intersection. Therefore, even with a complicated-shaped intersection of five or more branches that has been difficult for branch determination based on turn signals, the branch determination can be thus made, and the intersection traffic information can be generated. This thus enables to generate the intersection traffic information for every branch direction irrespective of the shape of the intersection with no burden imposed on the vehicle mounted device 1.

Second Embodiment

Figure 4:
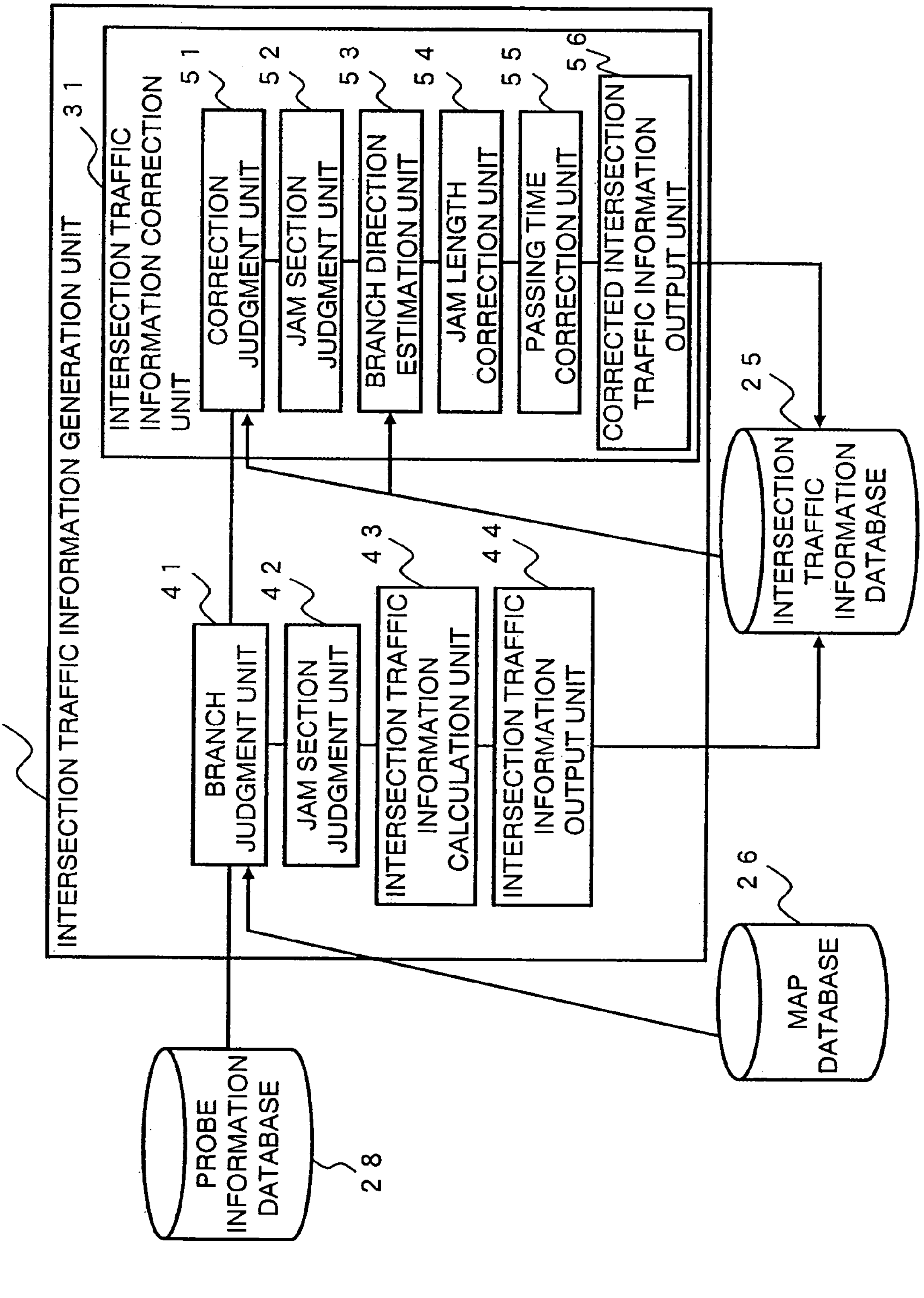
FIG. 4 is a block diagram showing an exemplary intersection traffic information generation unit for use in a traffic information calculation device in a second embodiment of the present invention.

FIG. 4 is a block diagram showing the intersection traffic information generation unit 24 for use in a traffic information calculation device in a second embodiment of the present invention.

In the present embodiment, other than the configuration of the intersection traffic information generation unit 24 described in the first embodiment, the intersection traffic information generation unit 24 includes an intersection traffic information correction unit 31 that calculates the intersection traffic information before a probe vehicle passes an intersection, and corrects the intersection traffic information.

The intersection traffic information correction unit 31 includes: a correction judgment unit 51 that receives, as an input, the probe information determined by the branch judgment unit 41 as not having been passed the intersection, and determines whether the intersection traffic information can be corrected or not using the probe information; and a jam section judgment unit 52 that determines a congestion interval in the trace of the probe information input to the correction judgment unit 51.

Moreover, the intersection traffic information correction unit 31 includes: a branch direction estimation unit 53 that estimates the branch direction of the probe vehicle; a jam length correction unit 54 that corrects the jam length using the probe information; a passing time correction unit 55 that corrects the passing time; and a corrected intersection traffic information output unit 56 that overwrites the intersection traffic information database 25 with the corrected intersection traffic information.

Figure 5:
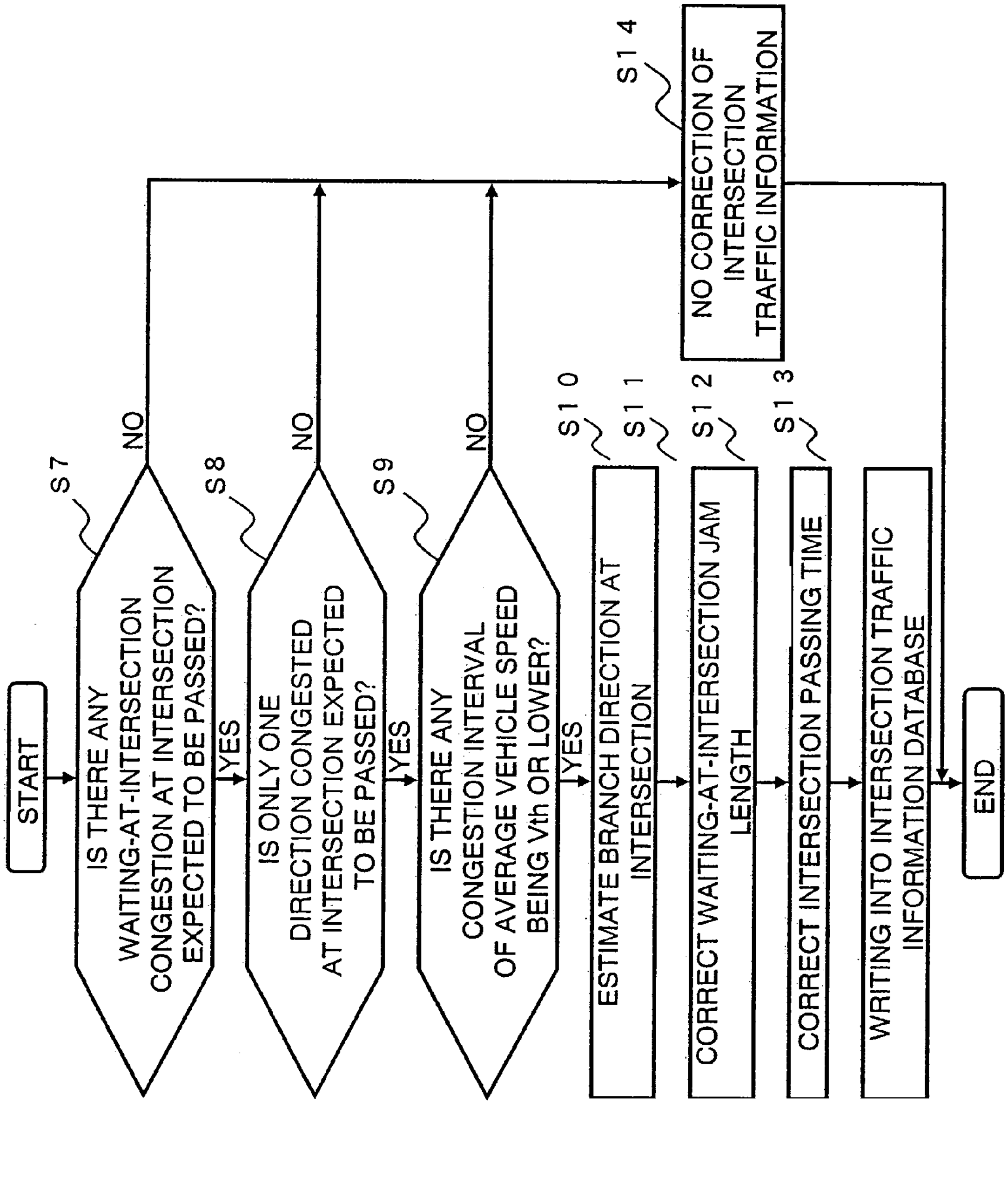
FIG. 5 is a flowchart showing an exemplary operation of the intersection traffic information generation unit for use in the traffic information calculation device in the second embodiment of the present invention.

By referring to the flowchart of FIG. 5, described next is the operation of the intersection traffic information correction unit 31 used in the present embodiment.

Note here that the intersection traffic information correction unit 31 of the present embodiment is configured to correct the intersection traffic information only when one branch direction at an intersection is only congested by waiting vehicles, and only when the probe information in which the probe vehicle is not yet passing the intersection is determined as showing any congestion.

That is, in the correction judgment unit 51, the intersection traffic information at the intersection expected to be passed is determined whether or not to be correctable by the probe information determined by the branch judgment unit 41 as not yet passed the intersection. In this example, as to the intersection traffic information for the intersection stored in the intersection traffic information database 25 for the vehicle to pass, determined is whether any congestion is occurring at the intersection based on the jam length or the waiting time (S7).

If there is no waiting-at-intersection congestion at the intersection expected to be passed, the intersection traffic information is not corrected (S14). Thereafter, another determination is made whether the waiting-at-intersection congestion is occurring only in one branch direction at the intersection (S8). When a plurality of branch directions are suffering from waiting-at-intersection congestion, it is determined that the branch direction cannot be estimated in advance for the probe information in which the probe car is not yet passing the intersection so that the intersection traffic information is not corrected (S14).

Similarly to the jam section judgment unit 42 of FIG. 2, the jam section judgment unit 52 calculates a congestion interval using the probe information. That is, in this example, similarly to the jam section judgment unit 42, the average vehicle speed Vave of the probe vehicle is calculated for every fixed distance or every fixed length of time. When the average vehicle speed Vave is lower than a threshold value Vth (e.g., 10 km/h) being a congestion determination factor, an interval from the corresponding small interval in the upstream of the traffic congestion to the head portion of the probe information (downstream side of the traffic flow) is determined as a congestion interval (S9). When there is no congestion interval, the intersection traffic information is not corrected (S14).

Figure 6:
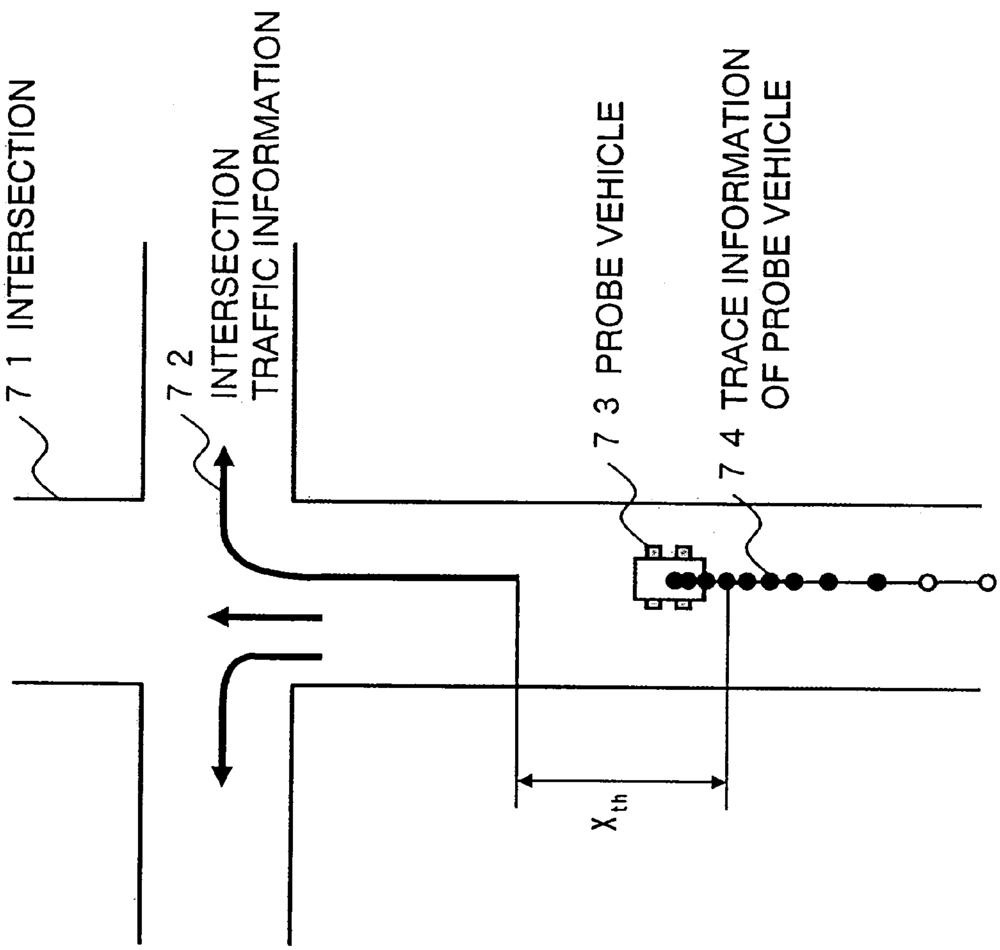
FIG. 6 is a conceptual view when the intersection traffic information is corrected in the traffic information calculation device in the second embodiment of the present invention.

By referring to FIG. 6, described next in detail is the specific state for such correction. In FIG. 6, the branch directions at an intersection 71 are represented by the directions of arrows in the intersection traffic information 72, and the jam length is represented by the lengths of the arrows. At the same time, the position of a probe vehicle 73, and trace information 74 of the probe vehicle (white circles, black circles) are both specifically indicated. Moreover, any part indicated by the black circles in the trace information is the trace having been determined as congested.

As such, at the intersection suffering from a congestion only to make right turns, when the probe information covering the area within a range of a predetermined distance Xth (e.g., in the range of 100 m or less) from the tail of the waiting-at-intersection congestion has an interval determined as being congested, this probe information is used to correct the intersection waiting information.

As shown in FIG. 6, at the intersection 71, only when a waiting congestion is observed only to one branch direction (direction of right turn in this example), and only when the probe information in which the probe vehicle is not yet passing the intersection is determined as being congested, the branch direction estimation unit 53 determines that the probe vehicle is waiting at the branch location to head to the congested branch direction (S10).

Figure 7:
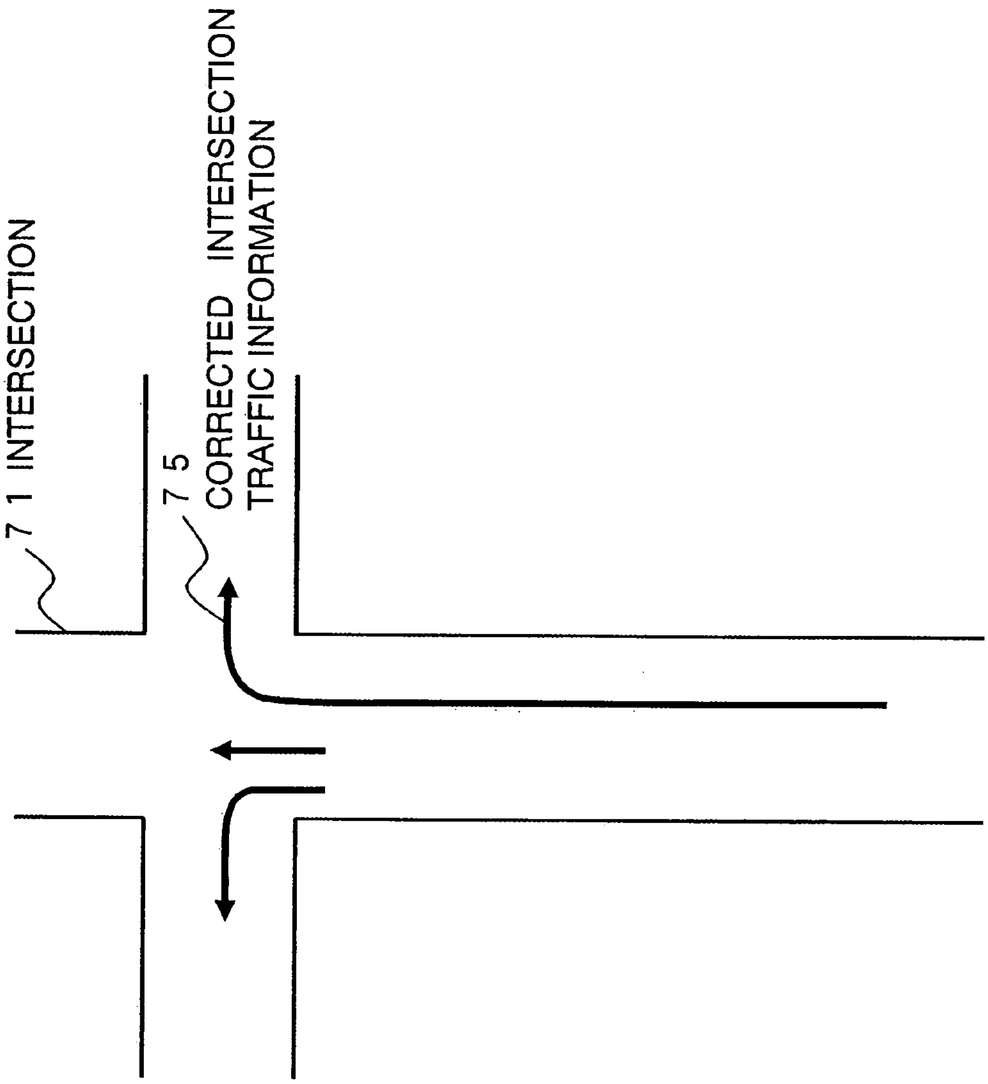
FIG. 7 is a conceptual view after the intersection traffic information is corrected in the traffic information calculation device in the second embodiment of the present invention.

Thereafter, the jam length correction unit 54 corrects the intersection traffic information, and as shown in FIG. 7, corrected intersection traffic information 75 as a result of correction is displayed. That is, FIG. 7 is a conceptual view showing the corrected intersection traffic information 75 though with the correction process, and showing the intersection 71, and the corrected intersection traffic information 75 that has been corrected using the trace information 74 of the probe vehicle. The jam length correction unit 54 calculates the congestion interval after the correction in such a manner that the tail (upstream side) of the congestion in the intersection traffic information 72 is extended to the tail (downstream side) of the trace information 74 of the probe vehicle (S11).

The above case is an exemplary case where the jam length at the intersection increases as time passes. Similarly to a case where the congestion at the intersection reduces as the time passes, the tail of the congestion in the intersection traffic information is brought closer to the tail of the trace information of the probe vehicle. That is, in this case, the intersection traffic information 72 becomes a piece with the trace information 74 of the probe vehicle, for example. The start point (upstream side) of the trace information 74 of the probe vehicle will show a white circle that is not determined as being congested so that the intersection traffic information 72 is shortened to the portion of black circles determined as being congested.

The passing time correction unit 55 calculates the intersection passing time from the jam length calculated as such. Assuming that the intersection passing time T before correction is the waiting-at-intersection jam length L1 before correction, T/L1 is the intersection passing time per congestion unit distance. Herein, assuming that the jam length after correction is L2, (L2/L1)×T is calculated as the intersection passing time after correction (S12).

In the corrected intersection traffic information output unit 56, the corrected intersection traffic information calculated as such is stored by overwriting therewith the corresponding portion of the intersection traffic information database 25 so as to enable reading from the control unit 27 (S13).

As such, by correcting the intersection traffic information using the probe information in which the probe vehicle is not yet passing the intersection, any delay in calculating the intersection traffic information can be reduced for calculation after the probe vehicle passes the intersection so that the resulting intersection traffic information can be calculated using information closer to real time. That is, before the probe vehicle passes the intersection, it becomes able to calculate the intersection traffic information at the intersection for every branch direction.

In the present embodiment, as described in the foregoing, described is the case that the intersection traffic information correction unit 31 corrects the intersection traffic information only when one branch direction at the intersection is congested, and only when the probe information in which the probe vehicle is not yet passing the intersection is determined as being congested. The present invention is not restrictive thereto, and when a plurality of branch directions at the intersection are congested, the intersection traffic information 72 determined as being congested is extended or shortened in accordance with the extent of the intersection traffic information 72, and the intersection traffic information can be corrected depending on the branch direction.

With this being the case, if the trace information 74 of the probe vehicle is calculated for every lane, it becomes possible to perform correction with more details.

Third Embodiment

Figure 8:
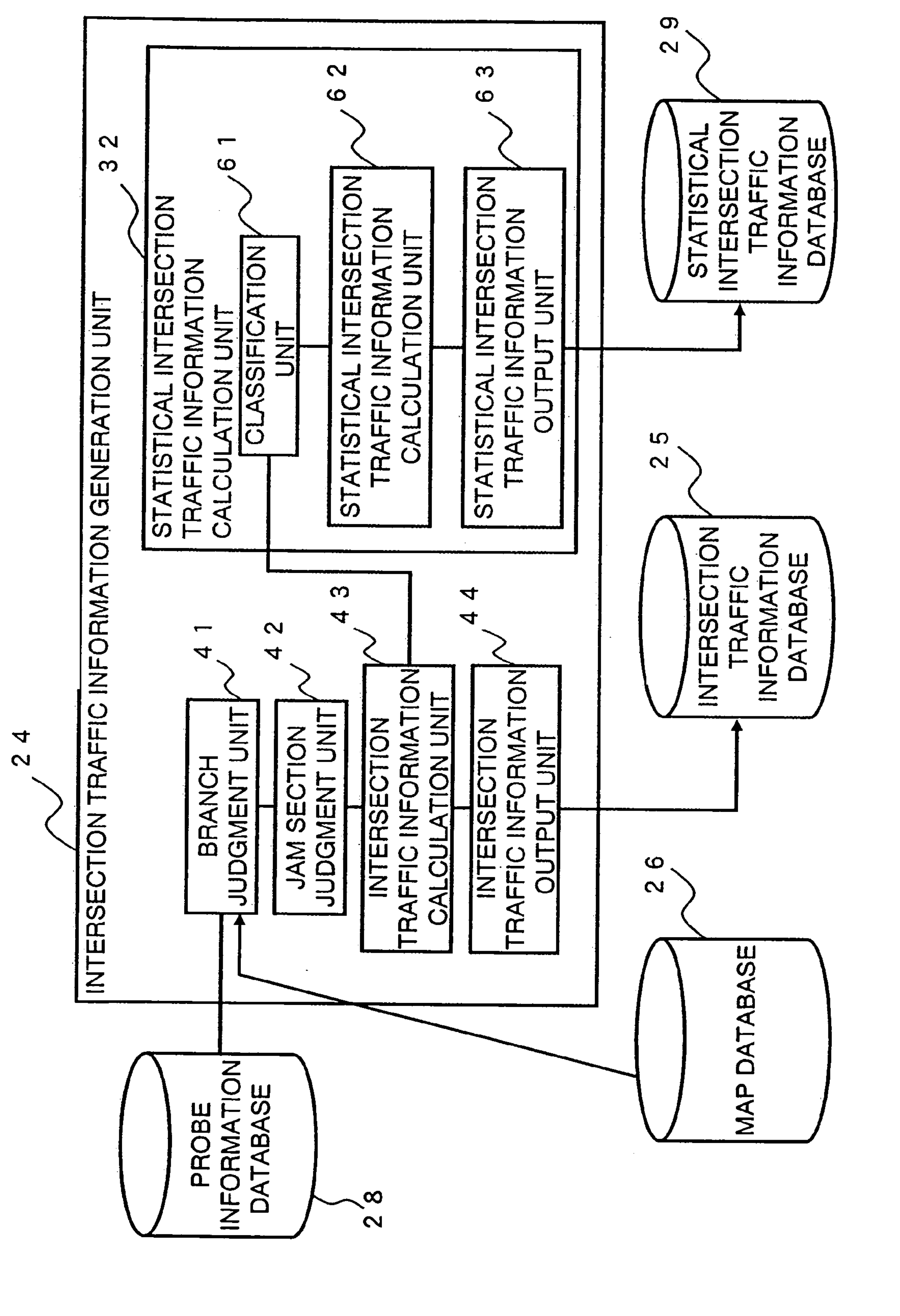
FIG. 8 is a block diagram showing an exemplary intersection traffic information generation unit for use in a traffic information calculation device in a third embodiment of the present invention.

FIG. 8 is a block diagram showing the intersection traffic information generation unit 24 for use in a traffic information calculation device in a third embodiment of the present invention.

In the present embodiment, the intersection traffic information generation unit 24 calculates the intersection traffic information in a statistical manner. That is, in the present embodiment, other than the configuration of the first embodiment of FIG. 2, the intersection traffic information generation unit 24 is provided with a statistical intersection traffic information calculation unit 32 that calculates the intersection traffic information in a statistical manner. The operation in the configuration of FIG. 2 is the same as the one described in the above, and herein, mainly the statistical intersection traffic information calculation unit 32 is described in detail.

The statistical intersection traffic information calculation unit 32 includes: a classification unit 61 that classifies the times and days when the intersection traffic information calculation unit 43 calculates the intersection waiting time information into several predetermined patterns, e.g., holidays and workdays; a statistical intersection traffic information calculation unit 62 that performs smoothing by going through a statistical process, e.g., taking an average between the calculated intersection traffic information and the past intersection waiting time information or the jam length accumulated in the statistical intersection traffic information database 29, and calculates the statistical waiting time information or the jam length; and a statistical intersection traffic information output unit 63 that stores the calculated statistical intersection traffic information in the statistical intersection traffic information database 29.

Figure 9:
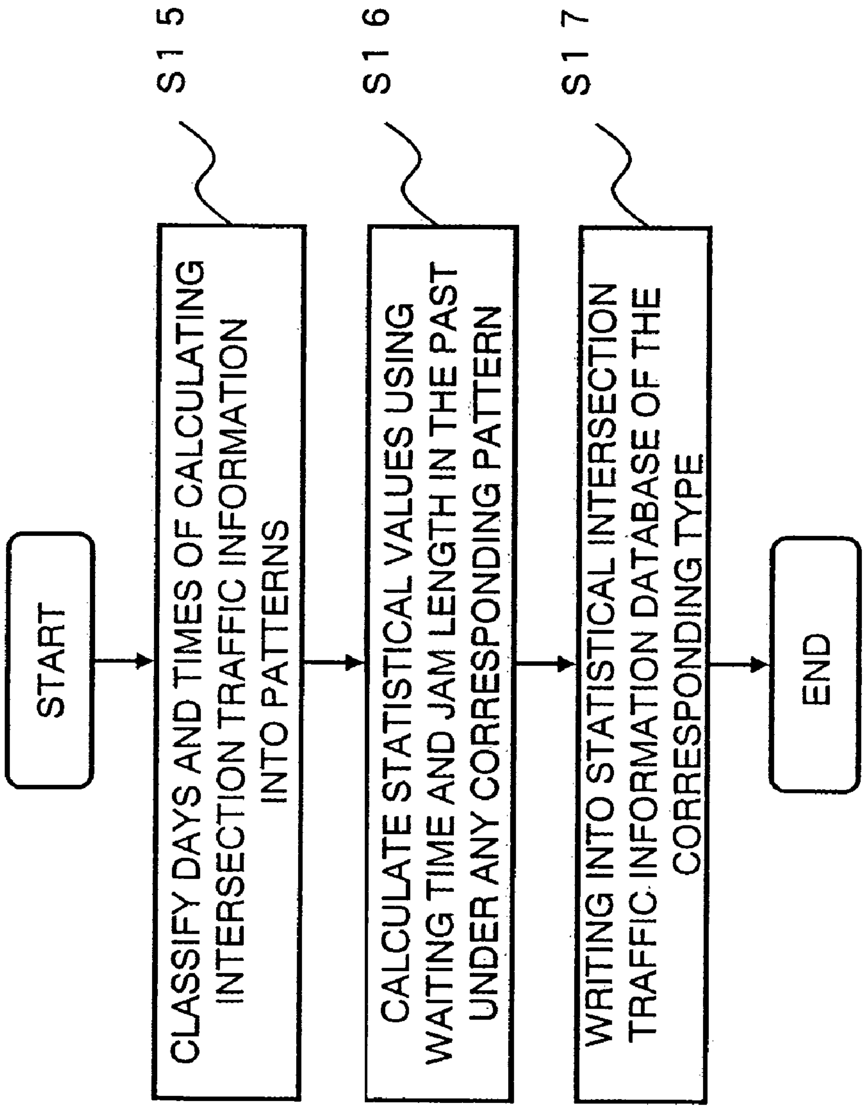
FIG. 9 is a flowchart showing an exemplary operation of the intersection traffic information generation unit for use in the traffic information calculation device in the third embodiment of the present invention.

By referring to the flowchart of FIG. 9, the operation of the statistical intersection traffic information calculation unit 32 configured as such is described.

The classification unit 61 classifies the times and days when the intersection traffic information calculation unit 43 calculates the intersection waiting time information or the jam length based on a predefined pattern (S15).

FIG. 10 shows the outline of such classification, and the outline of a method of storing statistical intersection traffic information to the statistical intersection traffic information database 29. In this example, classification is made according to any type observed with some change to the traffic amount at intersections with some specific tendency from any normal state, e.g., weekdays, weekends, long consecutive holidays, and New Year's Day. Any other possible classification may use or add summer holidays, holidays, consecutive holidays, Christmas, various activities, days with 5 or 0 in the last digit, and others.

More in detail, for example, in FIG. 10, right-turn-waiting information at an MM intersection tells that, in a weekday afternoon, the waiting time is 15 minutes, and the jam length is 350 m. In a case with long consecutive holiday afternoon, the information tells that the waiting time is 25 minutes, and the jam length is 500 m. Note that, in FIG. 10, only the right-turn-waiting information at the MM intersection is specifically exemplified, and right-turn-waiting information at an NN intersection is not specifically exemplified.

For every pattern of the classification unit 61, the statistical intersection traffic information calculation unit 62 performs smoothing to the latest intersection traffic information and the past intersection waiting time information or the jam length accumulated in the statistical intersection traffic information database 29, and calculates the statistical intersection traffic information (S16).

For reading from the control unit 27, the statistical intersection traffic information output unit 63 writes the calculated statistical intersection waiting time information or jam length to the statistical intersection traffic information database 29 (S17).

Generating the statistical intersection traffic information to every intersection nationwide requires managing huge amount of data, and is considered quite difficult. However, only intersections causing the long waiting time or the larger jam length may be extracted, and the statistical intersection traffic information may be generated so that the data amount to be managed can be made to an appropriate value.

Moreover, the classification method may be changed by changing the detail level of the classification for every intersection. If this is the case, the data amount to be managed can be also reduced. That is, the detail level of the classification may be changed depending on the characteristics of the intersections, e.g., if no change is observed to the congestion, no distinction may be made between weekdays and weekends for the corresponding intersections, and thus the amount of data can be reduced.

With such a configuration, in the present embodiment, even when a vehicle carrying therein an vehicle mounted device does not pass an intersection, and thus no intersection traffic information is generated, the past statistical values can be used as the intersection waiting time, and the congestion level at the intersection and the approximate value of a passing time can be provided to a driver.

Note that in the above embodiment, exemplified is a GPS serving as the positioning satellite means, but the present invention is not restrictive thereto.

Fourth Embodiment

Figure 11A:
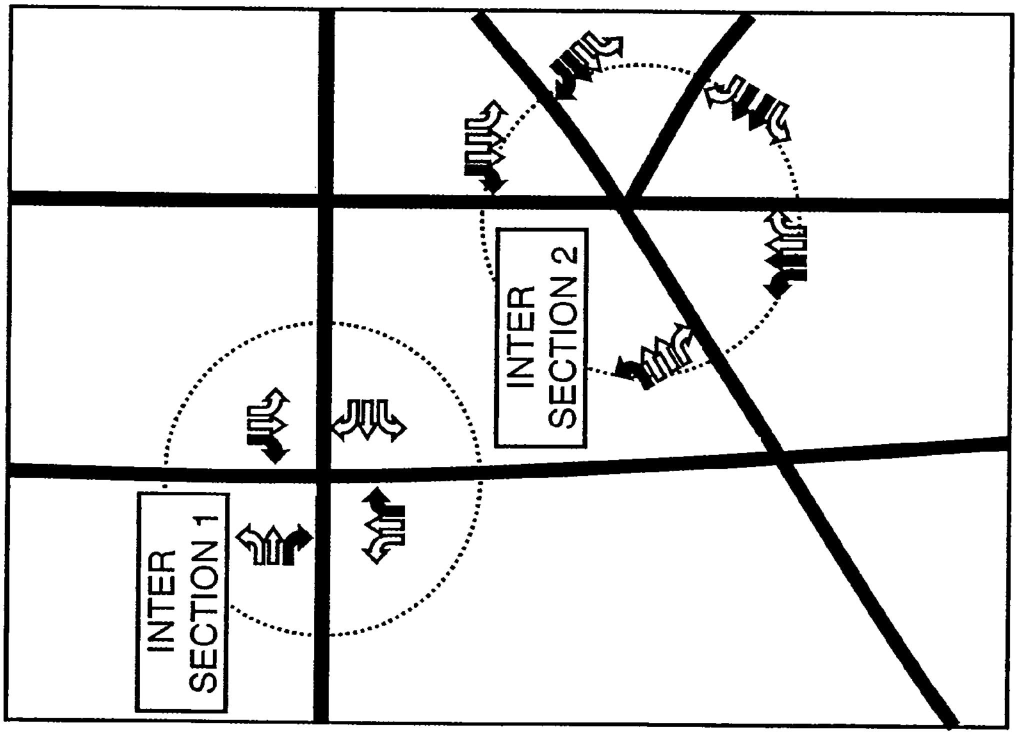
FIG. 11(A) is a diagram showing an exemplary traffic information display method on a map in a fourth embodiment of the present invention.

FIGS. 11(A) and (B) are diagrams respectively showing the congestion at intersections 1 and 2 for every branch direction in a fourth embodiment of the present invention. FIG. 11(A) displays arrows as many as the branch directions at the intersection, and the arrows are represented by each different color depending on the waiting time information and the level of the congestion. For example, because the intersection 1 is a crossroad branching into four, the number of arrows is three to indicate the congestion level of the branch directions. Moreover, because the intersection 2 is a five-forked road branching into five, the number of arrows is four to indicate the congestion level of the branch directions, and only the arrow(s) in the congested branch direction(s) are highlighted for display.

Such a display is made on the display 14 using the cartographic data in the map database 15 through reception, by the reception unit 13, of traffic information including waiting time information and a jam length coming from the communications unit 21 of the center station 2 depending on the details of a request made by the vehicle mounted device 1 of FIG. 1 in the present embodiment to the center station 2, and through control of the control unit 16 based on the traffic information.

Figure 11B:
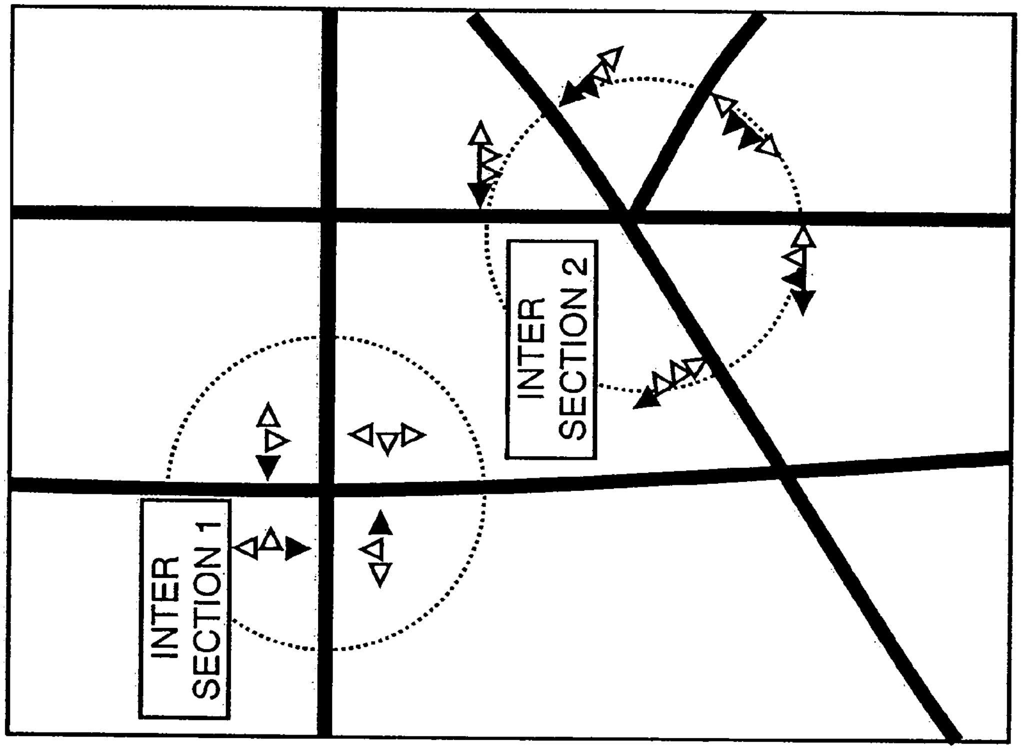
FIG. 11(B) is a diagram showing another example thereof.

FIG. 11(B) uses triangle marks or others for display as an alternative to the arrows as many as the number of branch directions, and the viewability is increased with the lower density of the marks.

For example, when the vehicle speed of the probe vehicle is 10 km/h or lower, it is determined that congestion is occurring and thus a mark in red is used. If with 10 to 20 km/h, it is determined that congestion is occurring and thus a mark in yellow is used, and if with 20 km/h or higher, it is determined that the road is not congested and thus a mark in green is used. As such, the congestion level may be represented by the mark color so that the viewability is increased to a further degree.

What is more, as to the jam length, the arrow lengths or triangle sizes may be put into three different levels, and the jam length may be represented as long, little long, no congestion, for example, so that the mark viewability can be increased.

In any area having many intersections, arrows and triangle marks indicating the branch-direction-based congestion level may possibly be densely displayed. In consideration thereof, for the aim of increasing the viewability of a driver, the branch-direction-based congestion level may be displayed only for any predetermined main intersections, or alternatively, for any predetermined intersections of main roads such as national roads and state roads.

Still alternatively, if any emphasis is placed on the viewability of cartographic information in the driving direction, as alternatives to arrows and triangle marks placed in the vicinity of an intersection, the arrows and triangle marks may be displayed on the periphery of the display screen in a corresponding manner to any predetermined intersection for every branch direction.

Still alternatively, instead of displaying the arrows and triangle marks for every branch direction, those may be displayed only in any congested branch direction. With this being the case, the marks are not densely displayed.

As described in the foregoing, in the present embodiment, the driver can perceive the congestion waiting time and the jam length on the display screen for every branch direction so that the driver can easily select and determine which direction to go.

Fifth Embodiment

Figure 12A:
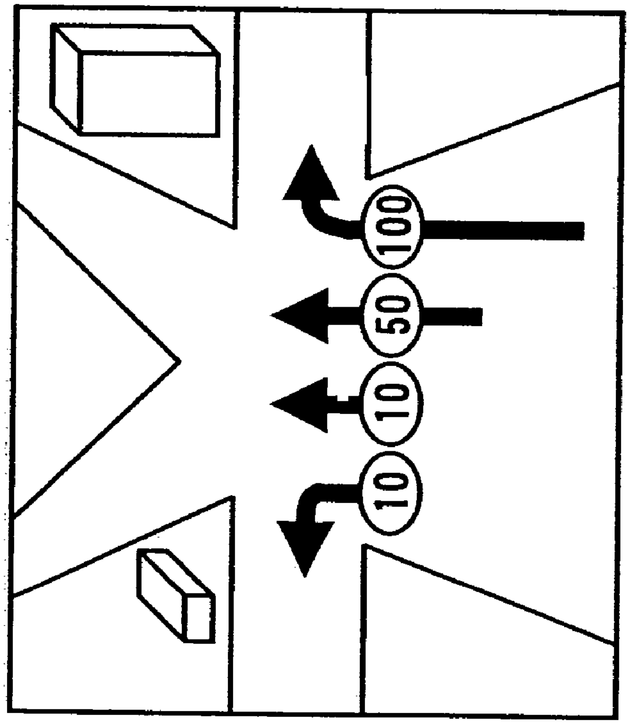
FIG. 12(A) is a diagram showing an exemplary traffic information display method using an enlarged view of an intersection in a fifth embodiment of the present invention.

FIGS. 12(A) and (B) are diagrams each showing an exemplary display in a fifth embodiment of the present invention, in the enlarged diagram of an intersection for every branch direction at the time when a vehicle comes closer to the intersection. FIG. 12(A) shows arrows indicating the jam length for every branch direction. The arrows are displayed by each different color depending on the waiting time information and the congestion level. Moreover, the length of the arrows is displayed in proportion to the jam length for every branch direction, and as shown in FIG. 12(A), the actual jam length (e.g., 10 m, 50 m, or 100 m) may be displayed at the same time.

Figure 12B:
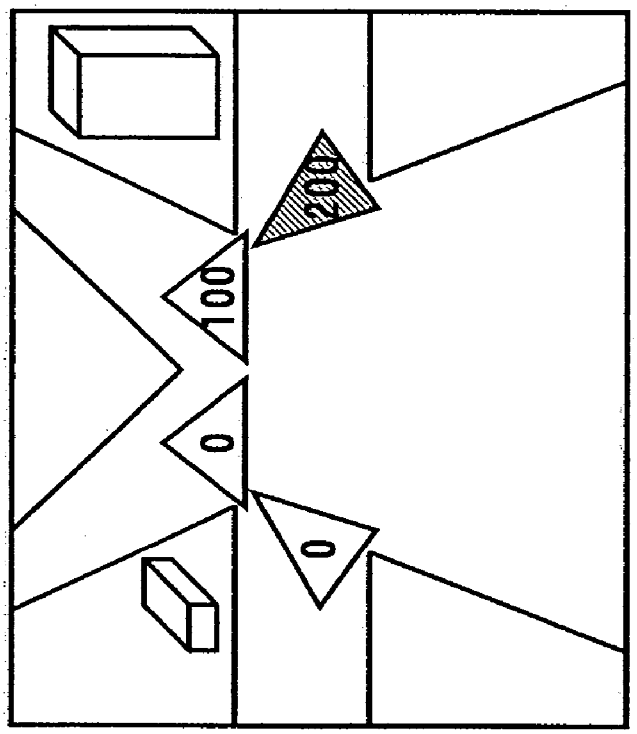
FIG. 12(B) is a diagram showing another example thereof.

FIG. 12(B) is displaying the waiting time for every branch direction in the enlarged diagram of the intersection. In this case, triangle marks or others may be displayed for every branch direction, and the marks are displayed by each difference color depending on the time information and the congestion level. Moreover, the waiting time for every branch direction (e.g., 0 second, 100 seconds, or 200 seconds may be displayed at the same time.

Note here that the display examples of FIGS. 11(A) and (B), or FIGS. 12(A) and (B) are possibly used for display on a traffic information map in vehicle mounted terminals such as car navigation systems, mobile terminals, and various types of traffic information display devices such as PCs.

As such, also in the present invention, drivers can look and know on a display screen a congestion waiting time and a jam length at an intersection for every branch direction, and thus the driver can easily select and determine which direction to go.

As described in the foregoing, the present invention enables drivers to easily understand the congestion level at an intersection on a branch direction basis irrespective of the number of branch directions at the intersection by displaying traffic information for every branch direction at the intersection with a correlation established with intersections on a map.

INDUSTRIAL APPLICABILITY

A traffic information calculation device of the present invention is capable of easily making branch determination and generating intersection traffic information at a complicated-shaped intersection of five or more branches that has been difficult for branch determination based on turn signals, and is very useful for navigation devices using traffic information calculation device at the intersection.

The invention claimed is:

1. A traffic information calculation device, comprising:

vehicle information acquisition unit configured to acquire vehicle information from a plurality of vehicles, the vehicle information including positions of the plurality of vehicles, and times at which the positions of the plurality of vehicles are acquired;

branch determination unit configured to determine a direction of a vehicle of the plurality of vehicles exiting an intersection based on (1) a position of the intersection stored in a map database and (2) the vehicle information of the vehicle, the vehicle capable of exiting the intersection in more than two directions; and intersection traffic information calculation unit configured to calculate, from the vehicle information of the plurality of vehicles, a waiting time or a jam length at the intersection for each of the more than two directions.

2. The traffic information calculation device according to claim 1, characterized in that the intersection traffic information calculation unit calculates the waiting time or the jam length at the intersection for each of the more than two directions using a driving speed of each of the plurality vehicles derived from the vehicle information.

3. The traffic information calculation device according to claim 2, characterized in that the driving speed of each of the plurality vehicles is derived based on at least either a vehicle speed pulse signal or positioning satellite information.

4. A traffic information calculation method comprising:

acquiring vehicle information from a plurality of vehicles, the vehicle information including positions of the plurality of vehicles and times at which the positions of the plurality of vehicles are acquired, determining a direction of a vehicle of the plurality of vehicles exiting an intersection based on (1) a position of the intersection stored in a map database and (2) the vehicle information of the vehicle, the vehicle capable of exiting the intersection in more than two directions, and calculating, from the vehicle information of the plurality of vehicles, a waiting time or a jam length at the intersection for each of the more than two directions.

5. A traffic information display method in which an intersection is displayed on a map, and in accordance with an intersection on the map having more than two directions along which a vehicle may exit the intersection, a waiting time or a jam length at the intersection is displayed for each of the more than two directions, the waiting time or the jam length at the intersection being calculated from vehicle information acquired from a plurality of vehicles, the waiting time or the jam length calculated for each of the more than two directions, the vehicle information including positions of the plurality of vehicles and times at which the positions of the plurality of vehicles are acquired.

6. A traffic information display device, comprising: cartographic information storage means that stores cartographic information including an intersection from which a vehicle may exit in more than two directions, and display means that displays, in accordance with the intersection on a map stored in the cartographic information storage means, a waiting time or a jam length at the intersection for each of the more than two directions, the waiting time or the jam length at the intersection being calculated from vehicle information acquired from a plurality of vehicles, the vehicle information including positions of the plurality of vehicles and times at which the positions of the plurality of vehicles are acquired.

* * * * *